(12) United States Patent
Ikeda et al.

(10) Patent No.: US 9,062,223 B2
(45) Date of Patent: *Jun. 23, 2015

(54) AQUEOUS INKJET INK AND METHOD FOR FORMING INKJET IMAGE

(75) Inventors: Masashi Ikeda, Koganei (JP); Hirotaka Iijima, Hachioji (JP); Hisashi Mori, Hino (JP)

(73) Assignee: KONICA MINOLTA, INC. (JP)

( * ) Notice: Subject to any disclaimer, the term of this patent is extended or adjusted under 35 U.S.C. 154(b) by 183 days.

This patent is subject to a terminal disclaimer.

(21) Appl. No.: 13/807,134

(22) PCT Filed: Jun. 23, 2011

(86) PCT No.: PCT/JP2011/064374
§ 371 (c)(1),
(2), (4) Date: Dec. 27, 2012

(87) PCT Pub. No.: WO2012/005115
PCT Pub. Date: Jan. 12, 2012

(65) Prior Publication Data
US 2013/0106945 A1    May 2, 2013

(30) Foreign Application Priority Data
Jul. 9, 2010 (JP) ................................ 2010-156477

(51) Int. Cl.
*C09D 11/00* (2014.01)
*C09D 11/30* (2014.01)
(Continued)

(52) U.S. Cl.
CPC .............. *C09D 11/30* (2013.01); *B41J 11/002* (2013.01); *B41J 2/2107* (2013.01); *C09D 11/326* (2013.01); *C09D 11/38* (2013.01); *B41M 5/0011* (2013.01)

(58) Field of Classification Search
CPC .......... B41J 2/01; B41J 2/2107; B41J 11/002; B41J 11/0015; C09D 11/00; C09D 11/30; C09D 11/322; C09D 11/326; C09D 11/38; B41M 5/0011
USPC ............................................ 347/95–102, 104
See application file for complete search history.

(56) References Cited

U.S. PATENT DOCUMENTS 8,393,728 B2 * 3/2013 Ikeda et al. ................... 347/102
2004/0189764 A1 * 9/2004 Aono et al. ................... 347/100
(Continued)

FOREIGN PATENT DOCUMENTS

JP    2000109733 A  *  4/2000
JP    2001-279151 A    10/2001
(Continued)

OTHER PUBLICATIONS

International Search Report for International application No. PCT/JP2011/064374 mailing date of Sep. 20, 2011 with English translation.

*Primary Examiner* — Matthew Luu
*Assistant Examiner* — Rut Patel
(74) *Attorney, Agent, or Firm* — Cantor Colburn LLP

(57) ABSTRACT

Disclosed is an aqueous inkjet ink which may contain water, a pigment, an organic or an inorganic acid, an amine, a resin that has a higher pKa than the organic or the inorganic acid, and a cross-linking agent. The aqueous inkjet ink exhibits excellent abrasion resistance even in cases where the drying time is short, while having high bleeding resistance and high storage stability. Also disclosed is a method for forming an inkjet image.

9 Claims, 1 Drawing Sheet

(51) Int. Cl.
  *B41J 11/00*  (2006.01)
  *B41J 2/21*  (2006.01)
  *C09D 11/326*  (2014.01)
  *C09D 11/38*  (2014.01)
  *B41M 5/00*  (2006.01)

(56) References Cited

U.S. PATENT DOCUMENTS

2009/0081367 A1* 3/2009 Makuta et al. ............... 427/256
2010/0149231 A1* 6/2010 Mori et al. ..................... 347/6
2010/0245508 A1* 9/2010 Ikeda et al. ................... 347/95
2012/0218342 A1* 8/2012 Ikeda et al. ................... 347/20

FOREIGN PATENT DOCUMENTS

| | | |
|---|---|---|
| JP | 2007-269864 A | 10/2007 |
| JP | 2008-297483 A | 12/2008 |
| JP | 2010-142965 A | 7/2010 |
| JP | 2010-260345 A | 11/2010 |
| WO | 2011055595 A1 | 5/2011 |

* cited by examiner

AQUEOUS INKJET INK AND METHOD FOR FORMING INKJET IMAGE

CROSS REFERENCE TO RELATED APPLICATIONS

This is the U.S. national stage of application No. PCT/JP2011/064374, filed on 23 Jun. 2011. Priority under 35 U.S.C. §119(a) and 35 U.S.C. §365(b) is claimed from Japanese Application No. 2010-156477, filed 9 Jul. 2010, the disclosure of which is also incorporated herein by reference.

FIELD OF THE INVENTION

The present invention relates to a method for forming an inkjet image by using an inkjet method and an inkjet ink used thereto, especially an aqueous inkjet ink.

TECHNICAL BACKGROUND

A method for forming an inkjet image can form an image easily and inexpensively, being thereby utilized in a wide variety of printing fields such as photography, various prints, signs, or color filters.

Over recent years, demand for signs printed on a non-water absorptive recording medium such as vinyl chloride by using a aqueous ink having low environmental load have increased for various applications such as an outdoor signboard which requires long term weather resistance or a printed matter which requires adhesion to an object having a curved surface. However, it was difficult for the aqueous ink to obtain sufficient abrasion resistance on non-absorptive recording medium, and it needs to improve abrasion resistance. In order to improve the abrasion resistance on non-absorptive medium such as vinyl chloride, disclosed are the aqueous ink which contains resin and a cross-linking agent (for example, refer to Patent Document 1). However, even though the abrasion resistance is improved, since a cross linking reaction after ejection of the aqueous ink is rate limiting, it requires much time to cure a resin with a cross-linking agent in this technology. Therefore, the improvement in a cross linking reaction rate was an issue. Even though a mean in which a medium is heated at high temperature is known in order to accelerate the cross linking reaction rate, it can apply only to a medium having a heat-resistance, and there is a problem which causes loosing media flexibility.

Further, applications to high-speed printing to non-absorptive media (such as vinyl chloride, art paper, or coated paper) have been expanding. However, when an image is formed on such a medium using aqueous inks, there has been produced such a problem that spotting and bleed (hereinafter referred to as bleeding) occur due to aggregation among inks. To improve this image quality degradation, it is known that ink viscosity needs to increase to some extent immediately after printing. As a technology to increasing viscosity, disclosed was a technology in which an inkjet ink containing a non-water soluble resin neutralized with an amine as a binder resin is used, whereby bleed is considered to be reduced (for example, Patent Document 2). However, this technology could not result in satisfactorily resolving the problem of the bleeding.

PRIOR TECHNICAL DOCUMENT

Patent Document

Patent Document 1: Unexamined Japanese Patent Application Publication (hereafter referred to as JP-A) No. 2001-279151
Patent Document 2: JP-A No. 2007-269864

SUMMARY

Problems to be Solved by the Present Invention

One of the objects of the present invention is to provide an aqueous inkjet ink which exhibits excellent abrasion resistance even in cases where the drying time is short, while having high bleeding resistance and high storage stability and a method for forming an inkjet image.

Means to Solve the Problems

The above object of the present invention can be achieved by the following constitution:
1. An aqueous inkjet ink comprising water, a pigment, an organic or an inorganic acid, an amine, a resin which has a higher pKa than the organic or inorganic acid, and a cross-linking agent.
2. The aqueous inkjet ink of item 1, wherein the organic or the inorganic acid and the amine are formed via a disassociation of an amine salt.
3. The aqueous inkjet ink of item 1, wherein the organic or the inorganic acid and the amine are formed via a disassociation of an ammonium salt.
4. The aqueous inkjet ink of any one of items 1 to 3, wherein the cross-linking agent has at least one selected from oxazoline group and carbodiimide group.
5. The aqueous inkjet ink of any one of items 1 to 4, wherein a content of the organic or the inorganic acid is in the range from 0.1% by mass to 10% by mass based on the aqueous inkjet ink.
6. The aqueous inkjet ink of any one of items 1 to 5, wherein a concentration of the amine in the aqueous inkjet ink is in the range from 0.01 mol/L to 3.00 mol/L.
7. The aqueous inkjet ink of any one of items 1 to 6, wherein a pKa of the organic or the inorganic acid is not more than 5.
8. The aqueous inkjet ink of any one of items 1 to 7, wherein a content of the water is in the range from 20% by mass to 90% by mass based on the aqueous inkjet ink.
9. The aqueous inkjet ink of any one of items 1 to 8, wherein the pigment is dispersed by a resin which has a higher pKa than the organic or the inorganic acid.
10. An inkjet image forming method using the aqueous inkjet ink of any one of items 1 to 9, wherein an image forming surface of a recording medium on which the aqueous inkjet ink is ejected is heated in the range from 30° C. to 90° C.

Effects of the Invention

The present invention made it possible to provide an aqueous inkjet ink which exhibits excellent abrasion resistance even in cases where the drying time is short, while having high bleeding resistance and high storage stability and a method for forming an inkjet image.

PREFERRED EMBODIMENT OF THE INVENTION

Figure 1:
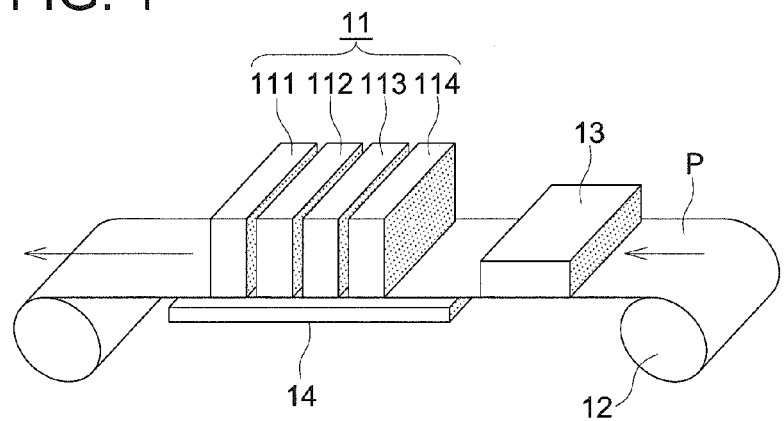
FIG. 1 is one example of the inkjet recording apparatus of a method for forming an inkjet image according to the present invention.

In view of the foregoing, the inventors of the present invention conducted diligent investigations and found that the cross linking reaction rate between a cross-linking agent and resin could be enhanced in an acidic reaction field. That is, when an organic acid or an inorganic acid coexists with amine in ink, since only the acid component which was being dissociated in the ink can remain after amine volatilizes, whereby pH can be lowered to acidity and as the result, a cross linking reaction advances. Moreover, in the case of coexisting with acid, since the counter anion of the resin having higher pKa is preferentially combined with a hydrogen ion by volatilization of amine in view of the equilibrium relation in an aqueous solution, thereby a non-dissociating carboxyl group can react with a cross linking group even in the case where water remains, and resulting in shortening the cross linking reaction time.

When a resin having a carboxyl group coexists with a resin having an oxazoline group in the aqueous solution, since the resin and the compound dissolve uniformly in the aqueous solution and the resin is neutralized by the base, generally the resin hardly reacts under a basic atmosphere. However, it is known that when water is lost, the carboxyl group and the oxazoline group bond together and form a cross linking structure and the non-volatilized component forms film, resulting in improving an abrasion resistance.

When the resin having carboxyl group neutralized with volatile amine is ejected onto the recording medium, amine will volatilize with evaporation of water. By measuring pH of the ink in the evaporation process with focus on pH change of ink, it was found that turned out that pH of ink decreases temporally but it falls only to a certain amount of pH and does not fall to acid pH where a cross linking reaction with an oxazoline group can be promoted.

Therefore, the decrease of pH is promoted by adding the organic acid or the inorganic acid and the amine disclosed in the present invention and obtained is the acidic atmosphere which results in promoting the cross linking reaction and shortening the curing time of resin and a cross-linking agent. Moreover, by reducing the solubility of the resin and the dispersibility of the pigment due to decreasing pH, precipitation and aggregation were made to cause, thereby the interaction between resins, pigments or resin and pigment are increased, and further it promotes the cross linking reaction between the resin, the pigment, and the cross-linking agent, and results in achieving the technical thought of the present invention which reduces bleeding by increasing viscosity according to above mechanism.

Since a volatilization of amine acts as a trigger of a cross linking reaction and a viscosity increasing in the present invention, it becomes possible to store the ink in a sealed system for a long time without decreasing pH and resulting in excellent storage stability. Moreover, as compared with the image formation method in which a processing liquid having a function of coagulating ink is applied and then inkjet ink is ejected in order to reduce bleeding, high image quality can be obtained by the simple image formation method only using inkjet ink.

The present invention will now be detailed further.
<<Aqueous Inkjet Ink>> (Hereinafter Also Referred to Simply as Inkjet Ink or Ink)

Aqueous inkjet inks according to the present invention will now be specifically be described.

In the present invention, an aqueous inkjet ink contains water, a pigment, an organic or inorganic acid, an amine, a resin having a higher pKa than the organic or inorganic acid, and a cross-linking agent. Further, an image formed surface of the recording medium is heated during inkjet recording, whereby a cross-linking reaction is accelerated and resulting in exhibiting excellent abrasion resistance even in cases where the drying time is short, while a bleed reduction effect can further be produced.

Moreover, in order to resolve the above-mentioned object, it is preferable that the ink contains water, a pigment, an organic or inorganic acid, an amine, a resin having a higher pKa than the organic or inorganic acid, and a cross-linking agent, and pKa of an acid component which is formed by dissociation of the resin is 5 or less.

Herein, the theory by which the effect of the aqueous inkjet ink of the present invention appears will be described. At first, the amine in the ink is emitted into the air after ink deposition due to its high volatility. As a result, $H^+$ in the ink increases and pH decreases. That is, due to volatilization of amine, only the acid component which is being dissociated in the ink remains and the water based inkjet ink becomes to show acidity. Moreover, since the counter anion of the resin having higher pKa is preferentially combined with a hydrogen ion in view of the equilibrium relation in an aqueous solution, thereby a non-dissociating carboxyl group can react with a cross linking group even in the aqueous solution. Therefore, it is estimated that the drying time of ink is shortened because that reaction atmosphere is acidic and the cross linking reaction can be advanced also in the aqueous solution.

Furthermore, the reason why the bleeding reduces is estimated as follows: due to pH decrease to a value where the pigment dispersion resin is in an un-dissociated state, the charge repulsion at the surface of the pigment decreases and pigments loose the charges and causes coagulations. Further, carboxyl group at the surface of the pigment reacts with the cross linking group of the cross linking agent and viscosity increases rapidly by forming a three-dimensional network through pigments.

By the presence of a water-soluble salt, the ink is concentrated via evaporation of water and the concentration of solids is increased, whereby the deposition of the resin and the aggregation of the pigment are further accelerated via salting-out.

The above effect is produced to a large extent when an organic or inorganic acid and an amine are formed from an organic or inorganic amine salt, and further a specifically large effect is produced when the resin is water-soluble.
(Organic or Inorganic Acids)

An organic acid according to the present invention refers to as organic compounds having acidity. However, the following resins according to the present invention are not included thereto.

An inorganic acid according to the present invention refers to as an acid where is formed by bonding the acid group containing non-metal to hydrogen. Any organic or inorganic acid can be applicable to the present invention, so long as it has lower pKa than the resin which exists in the ink. These acids exist in ink in a dissociated ion state from a hydrogen ion and a bonded state with a hydrogen ion, or a combination of both states. In the present invention, they are referred to as acid in the case of existing in any state in the ink. Specific examples of organic acids include: formic acid, acetic acid, propionic acid, butyric acid, isobutyric acid, valeric acid, isovaleric acid, oxalic acid, malonic acid, succinic acid, glutaric acid, maleic acid, fumaric acid, citraconic acid, itaconic acid, tricarballylic acid, glycolic acid, thioglycolic acid, lactic acid, malic acid, tartaric acid, citric acid, isocitric acid, gluconic acid, pyruvic acid, oxalacetic acid, diglycolic acid, benzoic acid, phthalic acid, mandelic acid, and salicylic acid. However, it is not limited thereto.

Specific examples of inorganic acids include: acetic acid, hydrochloric acid, sulfuric acid, chlorous acid, nitric acid, nitrous acid, sulfurous acid, phosphorous acid, phosphoric acid, a chloric acid, hypophosphorous acid, hydrobromic acid, hydroiodic acid, amide sulfuric acid, and boric acid. However, it is not limited thereto.

An organic or inorganic acid used in the present invention preferably has a pKa of at most 5. When plural acids are added, it is preferable that pKa is at most 5 as the whole acid component Incidentally, the pKa herein referred to represents the absolute value of the logarithmic value of the reciprocal of acid dissociation constant Ka, and a smaller numeric value thereof represents a stronger acid and a larger numeric value represents a weaker acid. Moreover, in the case that the organic acid or inorganic acid has a plurality of pKa, pKa in the present invention represents the value of pKa with the smallest numeric value. pKa of the organic or the inorganic acid can be determined by the well-known titration method, for example.

In the ink preparation process, the organic acid or inorganic acid according to the present invention may be directly added or added as an amine salt which has an acid component which can be considered as the organic acid or inorganic acid in the amine salt.

(Amine)

Amine according to the present invention is ammonia or a compound in which a hydrogen atom of ammonia is replaced with a hydrocarbon residue group.

Amine according to the present invention acts as a trigger for promoting cross linking of resin and a cross-linking agent. Since an amine is volatile, whereby the amine has an effect as the trigger.

As amines, listed are, in addition to ammonia, monoethanolamine, diethanolamine, triethanolamine, ethyl monoethanolamine, n-butyl monoethanolamine, dimethyl ethanolamine, diethyl ethanolamine, ethyl diethanolamine, n-butyl diethanolamine, di-n-butyl ethanolamine, and triisopropanolamine, which, however, are not limited thereto. Of these, it is preferable ammonia.

The concentration of any of these amines in an ink is preferably from not less than 0.01 mol/L to not more than 3.00 mol/L.

(Amine Salts)

In the present invention, amine salt is referred to as a compound in which an acid component is neutralized by amine. Of these, it is preferable that amine salt has a pKa of at most 5. With regard to acid components having plural pKa's, the lowest pKa is preferable at most 5 as whole acid components.

In the present invention, it is preferable that an organic acid or an inorganic acid and an amine are formed by adding an amine salt in the ink and dissociating from the amine salt in order to decrease a pH.

To further produce the effects of the present invention, a salt obtained via neutralization with an ammonium ion having a low-boiling point is preferable. As organic or inorganic ammonium salts obtained via neutralization of an acid component with an ammonium ion, listed are, for example, tri-ammonium phosphate, ammonium sulfide, ammonium acetate, di-ammonium citrate, tri-ammonium citrate, ammonium phthalate, ammonium lactate, ammonium benzoate, ammonium succinate, ammonium salicylate, ammonium tartrate, ammonium hydrogen tartrate, ammonium amidosulfate, ammonium oxalate, ammonium hydrogen oxalate, ammonium formate, ammonium fluoride, ammonium chloride, ammonium bromide, ammonium iodide, ammonium nitrate, and ammonium sulfate, which, however, are not limited.

An amine may be used instead of an ammonium ion, and examples of the amine include monoethanolamine, diethanolamine, triethanolamine, ethyl monoethanolamine, n-butyl monoethanolamine, dimethyl ethanolamine, diethyl ethanolamine, ethyl diethanolamine, n-butyl diethanolamine, di-n-butyl ethanolamine, and triisopropanolamine, which, however, are not limited.

The content of the above-mentioned organic acid or the inorganic acid in the ink is preferable from not less than 0.1% by mass to not more than 10% by mass based on the ink.

The added amount of the organic or the inorganic acid in the ink is preferably from not less than 0.1% by mass to not more than 10% by mass based in terms of mass percentage based on the total ink amount, more preferably from not less than 0.2% by mass to not more than 5.0% by mass. In the case of not less than 0.1% by mass, the pH of the ink can adequately be decreased. In the case of not less than 10% by mass, deterioration of the working environment caused by the increase of the amount of ammonia released via volatilization can be reduced.

<Resins>

A resin according to the present invention is characterized as a resin having a higher pKa as an acid component of the resin than the pKa of the above organic or inorganic acid.

The resin may be adsorbed to a pigment or may be present in the dissolved state for fixability or gloss enhancement. However, the state of being adsorbed to the pigment is preferable. In view of increasing viscosity, in addition to a resin adsorbed to the pigment, the resin is preferably added further in ink preparation, since the interaction of each resin or each pigment, or between the resin and the pigment is allowed to increase when pH is decreased.

Herein, a resin adsorbed to the pigment and a resin added in ink preparation may be the same or differ. When a plurality of the resins are added, at least one type thereof needs only to be a resin having a higher pKa as an acid component of the resin than the pKa of an organic or inorganic acid. All the plural resins added preferably have higher pKa's as the acid components of the resins than the pKa of such an organic or inorganic acid.

A resin having a higher pKa than the pKa of the organic or inorganic acid of the present invention is preferably water-soluble.

In the present invention, an acid component of the resin is neutralized by amines. With respect to the neutralization, the acid component of the resin may preliminarily be neutralized before adding the resin into the ink or may be neutralized by the amine according to the present invention after adding the resin into the ink. Neutralization of an acid component of a resin is not specifically limited. As examples of the neutralization, an amine, and a metal such as sodium, and lithium are cited. A counter amine is volatilized after drying. Therefore, from the viewpoint of water resistance, a resin having an acid neutralized with an amine is preferable.

A resin according to the present invention is preferably a resin in which an acid functional group such as a carboxyl group or a sulfo group is contained in a resin and the acid functional group in the resin is neutralized with an amine. Specific examples can be realized in such a manner that a part of a resin such as acrylic-based, styrene acrylic-based, acrylonitrile-acrylic-based, vinyl acetate acrylic-based, polyurethane-based, or polyester-based one is modified with an acid such as a carboxyl group or a sulfo group and then the resin is neutralized with an amine. As examples of such an amine used for neutralization, ammonia, dimethylamine, diethylamine, and ethylmethylamine are preferable. Ammonia of a low boiling point to further produce the effects of the present invention is specifically preferable.

A resin having an acid can be obtained by polymerizing a monomer. As such a monomer, those obtained via radical copolymerization of acrylic acid, methacrylic acid, itaconic acid, fumaric acid, or acid derivatives of styrene are listed. Further, copolymerization with another monomer may be carried out if appropriate.

The weight average molecular weight of a resin having an acid is preferably not less than 3,000 from the viewpoint of an image quality improvement effect according to the present invention and is preferably not more than 30,000 from the viewpoint of ejection properties and viscosity, more preferably from not less than 10,000 to not more than 20,000. Further, the acid value is preferably from not less than 60 mgKOH/g to not more than 300 mgKOH/g.

The content of a resin according to the present invention is preferably 0.5%-15% based on the total ink mass, more preferably 2.0%-10%. The content of a resin having an acid neutralized with an amine is 0.5%-15% based on the total ink mass, more preferably 2.0%-10%. In the case of not less than 0.5%, an adequate viscosity increasing effect is produced. In the case of not more than 15%, enhancement of the effect is expected and excellent ejection properties are maintained.

(Cross-Linking Agent)

The cross-linking agent according to the present invention means a compound which has a cross-linkable group, and a well-known cross-linking agent can be used. For example, listed are compounds: compound having carbodiimide group, compound having oxazoline group, compound having epoxy group, compound having isocyanate group, compound having aldehyde group, compound having N-methylol group, compound having acryloyl group, compound having vinyl sulfone group, compound having active halogen group, compound having ethyleneimino group, compound having glyoxal group, and compound having melamine. In the present invention, it is preferable the compound which has two or more groups (may be either the same group or different group) selected from the group which consists of carbodiimide groups and oxazoline groups is excellent in view of the storage stability after mixture and high safety.

Specific examples of the compound having carbodiimide group which can be used for the present invention include: carbodiimide, N,N'-dimethyl carbodiimide, N-ethyl,N'-isopropyl carbodiimide, N,N'-diisopropyl carbodiimide, N,N'-dicyclohexyl carbodiimide, N,N'-diphenyl carbodiimide, N,N'-diacetyl carbodiimide, N,N'-bis(2-propene)-carbodiimide, N,N'-dipyrrodyl carbodiimide, N,N'-diethoxy carbodiimide, bis(trimethylsillyl)carbodiimide, 1-cyclohexyl-3-(2-morpholinoethyl)carbodiimide-metho-paratoluenesulfonic acid salt, 1-ethyl-3-(3-dimethylamino propyl)carbodiimide hydrochloride, and calcium cyanamide. Further, CARBODILITE V-02, V-02, V-02-L2, V-04, V-06, E-01, and E-02, produced by Nisshinbo Chemical, Inc., can be used preferably.

Specific examples of the oxazoline compounds which can be used for the present invention include: 2-oxazoline, 2-methyl-2-oxazoline, 2-ethyl-2-oxazoline, 2-(n-propyl)-2-oxazoline, 2-(isopropyl)-2-oxazoline, 2-cyclohexyl-2-oxazoline, 2-phenyl-2-oxazoline, 2-pyrrolidyl-2-oxazoline, 2-acetyl-2-oxazoline, 2-(2-propene)-2-oxazoline, 4,5-dimethyl-2-oxazoline, 2,4,4-trimethyl-2-oxazoline, 5-phenyl-2-(2-propynylamino)-2-oxazoline-4-one, and 4-ethoxymethylene-2-phenyl-2-oxazoline-5-one. Further, EPOCROS series K-1010E, K-2010E, K-1020E, K-2020E, K-1030E, K-2030E, WS-500, WS-700, and RPS-1005 produced by NIPPON SHOKUBAI Co., Ltd., can be used preferably.

Any compounds available on the market or synthesized are applicable.

As for the content of the cross-linking agent according to the present invention, it is preferable 0.5%-15% as solid content to the total ink mass, and more preferably 2.0%-10%. An effect can fully be achieved at 0.5% or more, and balance can be achieved between ink ejection property by 15% or less.

<Other Resins>

Further, an ink according to the present invention may contain resins differing from a resin neutralized with the above amine for various purposes. Plural types of these resins may be added or copolymers thereof may be added, or these polymers may be dispersed in an emulsion state. When dispersion is carried out in such an emulsion state, from the viewpoint of impairing ejection properties based on an inkjet system, the average particle diameter of resin fine particles is preferably at most 300 nm. In the case of a water-soluble polymer, the composition and the molecular weight are not specifically limited, but the weight average molecular weight is preferably at most 50,000.

In the present invention, the difference between pKa of an organic or inorganic acid and pKa of a resin is preferably at least 0.5, more preferably at least 1.

<Water>

An ink according to the present invention contains water. The content of water in the ink is preferably from not less than 20% by mass to not more than 90% by mass.

<Water-Soluble Organic Solvents>

An ink according to the present invention may contain a water-soluble organic solvent. When the above resin is dissolved into the ink, a water-soluble organic solvent is preferably contained, as an ink solvent, in addition to water of 20% by mass-90% by mass in view of ejection properties enhancement and ink physical properties adjustment. Unless the effects of the present invention is impaired, types of water-soluble organic solvents are not specifically limited, including, for example, glycerin, propylene glycol, dipropylene glycol, tripropylene glycol, tetrapropylene glycol, polypropylene glycol, ethylene glycol, diethylene glycol, triethylene glycol, tetraethylene glycol, polyethylene glycol, decaglycerin, 1,4-butanediol, 1,3-butanediol, 1,2,6-hexanetriol, 2-pyrrolidinone, dimethylimidazolidinone, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, propylene glycol monobutyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tripropylene glycol dibutyl ether, 3-methyl-2,4-pentanediol, diethylene glycol monoethyl ether acetate, 1,2-hexanediol, 1,2-pentanediol, and 1,2-butanediol.

<Pigments>

As a pigment usable for an ink according to the present invention, those conventionally well-known can be used with no limitation. Any water-dispersible pigments and solventdispersible pigments are usable. For example, organic pigments such as insoluble pigments or lake pigments and inorganic pigments such as carbon black can preferably be used.

Such insoluble pigments are not specifically limited. Preferable are, for example, azo, azomethine, methine, diphenylmethane, diphenylmethane, triphenylmethane, quinacridone, anthraquinone, perylene, indigo, quinophtharone, isoindolinone, isoindoline, azine, oxazine, thiazine, dioxazine, thiazole, phthalocyanine, and diketopyrrolopyrrole.

As specific pigments which are preferably usable, the following pigments are listed:

As magenta or red pigments, listed are, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

As orange or yellow pigments, listed are, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, and C.I. Pigment Yellow 138.

As green or cyan pigments, listed are, for example, C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Other than the above pigments, when red, green, blue, or intermediate colors are required, the following pigments are preferably used individually or in combination. Used are, for example, C.I. Pigment Red: 209, 224, 177, and 194; C.I. Pigment Orange: 43; C.I. Vat Violet: 3; C.I. Pigment Violet: 19, 23, and 37; C.I. Pigment Green: 36 and 7; and C.I. Pigment Blue: 15:6.

Further, as black pigments, C.I. Pigment Black 1, C.I. Pigment Black 6, and C.I. Pigment Black 7 are listed.

Any pigment used in the present invention is preferably used via dispersion using a homogenizer, together with dispersants, as well as additives required for various desired purposes. As the homogenizer, usable are a well-known ball mill, sand mill, line mill, and high-pressure homogenizer.

The average particle diameter of a pigment dispersion used for an ink according to the present invention is preferably 10 nm-200 nm, more preferably 10 nm-100 nm, still more preferably 10 nm-50 nm.

Particle diameter determination can be carried out using a commercially available particle diameter analyzer employing, for example, a light scattering method, an electrophoretic method, or a laser Doppler method. Further, using a transmission electron microscope, pigment particle image photographing is carried out for at least 100 particles and this image is statistically processed using an image analyzing software such as Image-Pro (produced by Media Cybernetics, Inc.) for such particle diameter determination.

<Surfactants>

An ink according to the present invention preferably contains surfactants for ejection properties enhancement and wettability enhancement. As such surfactants used, any of cationic, anionic, amphoteric, and nonionic surfactants is usable. Specific examples of surfactants applicable to the present invention are not specifically limited but the following is preferably usable.

As cationic surfactants, listed are, for example, aliphatic amine salts, aliphatic quaternary ammonium salts, benzalkonium salts, benzethonium chloride, pyridinium salts, and imidazolinium salts.

As anionic surfactants, listed are, for example, fatty acid soap, N-acyl-N-methylglycine salts, N-acyl-N-methyl-β-alanine salts, N-acylglutamic acid salts, acylated peptides, alkylsulfonic acid salts, alkylbenzenesulfonic acid salts, alkylnaphthalenesulfonic acid salts, dialkylsulfosuccinic acid ester salts, alkylsulfoacetic acid salts, α-olefinsulfonic acid salts, N-acylmethyltauline, sulfated oil, higher alcohol sulfuric acid ester salts, secondary higher alcohol sulfuric acid ester salts, alkyl ether sulfuric acid salts, secondary higher alcohol ethoxysulfates, polyoxyethylene alkyl phenyl ether sulfuric acid salts, monoglysulfates, fatty acid alkylolamide sulfuric acid ester salts, alkyl ether phosphoric acid ester salts, and alkyl phosphoric acid ester salts.

As amphoteric surfactants, listed are, for example, carboxybetaine types, sulfobetaine types, aminocarboxylic acid salts, and imidazolinium betaine. And as nonionic surfactants, listed are, for example, polyoxyethylene secondary alcohol ether, polyoxyethylene alkyl phenyl ether, polyoxyethylene sterol ether, polyoxyethylene lanolin derivatives, polyoxyethylene polyoxypropylene alkyl ether, polyoxyethylene glycerin fatty acid esters, polyoxyethylene castor oil, cured castor oil, polyoxyethylene sorbitol fatty acid esters, polyoxyethylene glycol fatty acid esters, fatty acid monoglyceride, polyglycerin fatty acid esters, sorbitan fatty acid esters, propylene glycol fatty acid ester, saccharose fatty acid esters, fatty acid alkanolamides, polyoxyethylene fatty acid amides, polyoxyethylene alkylamines, alkylamine oxides, acetylene glycol, and acetylene alcohols.

Further, from the viewpoint of decreasing the surface tension of an ink, a portion of these surfactants is preferably substituted with a fluorine atom or a silicon atom.

These surfactants and solvents may be used individually or in combination.

<Other Additives>

An ink according to the present invention may further contain additives for various purposes. Depending on intended purposes to enhance various performances such as ejection stability, print head and ink cartridge compatibility, storage stability, and image storage stability, there can selectively be used, as appropriate, well-known additives such as polysaccharides, viscosity regulating agents, specific resistance regulating agents, coated film forming agents, UV absorbents, antioxidants, anti-fading agents, antifungal agents, and anti-stain agents, including, for examples, oil droplet fine particles such as liquid paraffin, dioctyl phthalate, tricresyl phosphate, or silicone oil; UV absorbents described in JP-A Nos. 57-74193, 57-87988, and 62-261476; anti-fading agents described in JP-A Nos. 57-74192, 57-87989, 60-72785, 61-146591, 1-95091, and 3-13376; and optical brightening agents described in JP-A Nos. 59-42993, 59-52689, 62-280069, 61-242871, and 4-219266.

<<Image Forming Method>>

In the method for forming an inkjet image of the present invention (hereinafter, referred to as simply the method for forming an image), image formation is carried out on a recording medium by ejecting an inkjet ink as liquid droplets from an inkjet head based on digital signals using a printer mounted with an inkjet ink according to the present invention.

The inkjet head used to carry out image formation by ejecting an ink according to the present invention may be either an on-demand system or a continuous system. Further, as the ejection system, there can be used any of the ejection systems including an electrical-mechanical conversion system (e.g., a single cavity type, a double cavity type, a vendor type, a piston type, a share mode type, and a shared-wall type) and an electrical-thermal conversion type (e.g., a thermal inkjet type and a BUBBLE JET (a registered trademark) type). Of these, in the image forming method of the present invention, a piezo-type inkjet recording head having a nozzle diameter of at most 30 μm is preferably used.

In the image forming method of the present invention, printing systems are not specifically limited, and either of a single-pass type or a scanning type may be employed. But the single-pass type is preferable in view of effective high-speed printing. A single-pass type method for forming an inkjet image is a method for forming an inkjet image in which when a recording medium is passed under one inkjet head unit, all dots are ejected to form an image in a single passing.

As a method to realize such a single-pass type image forming method, a line-head type inkjet head is preferably used.

Such a line-head type inkjet head refers to an inkjet head having a length of at least the width of a print range. In the line-head type inkjet head, a single head may cover at least the width of a print range, or plural heads may be constituted in combination to exceed the width of the print range as disclosed in JP-A No. 2007-320278.

One example of an inkjet recording apparatus usable for the image forming method of the present invention will now be described with reference to drawings.

FIG. 1 is a schematic view showing an inkjet recording apparatus of a single-pass system (a line-head system) applicable to the method for forming the image of the present invention.

In FIG. 1, the symbol 11 represents a line-head type head unit, incorporating head 111-114 ejecting inks each differing in hue. The nozzle pitch of each head is preferably about 360 dpi. Herein, the dpi referred to in the present invention represents the number of dots per 2.54 cm.

Printing coated paper P as a recording medium is sent in a roll layered state from conveyance mechanism 12 in the arrow direction. In this case, printing coated paper P may previously be heated to a predetermined temperature using heating section 13 such as an infrared heater. The image formed surface is appropriately controlled so as to have a temperature of 30° C.-90° C. specified by the present invention by using a temperature control plate 14 provided beneath. In the case of at least 30° C., the effect of increasing ink viscosity is sufficiently produced. In the case of at most 90° C., the effect of increasing the viscosity is appropriately maintained and in addition, damage to a recording medium can be reduced.

Figure 2:
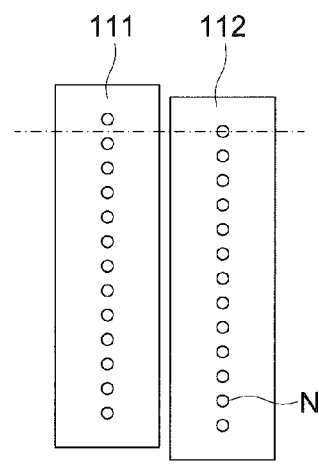
FIG. 2 is a bottom view showing an arrangement of nozzles at each head of the inkjet recording apparatus.

FIG. 2 is a bottom view showing a nozzle arrangement of each head bottom.

As shown in FIG. 2, nozzles N of head 111 and head 112, as well as head 113 and head 114 are placed in a zigzag arrangement so as to be displaced in a half pitch each. With such a head constitution, a more detailed image can be formed.

Figure 3:
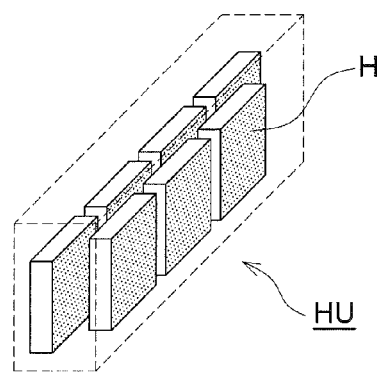
FIG. 3 is one example of a schematic diagram showing a head unit construction of the inkjet recording apparatus.

FIG. 3 is a schematic view showing one example of a head unit constitution.

When printing coated paper P of a large printing width is used, head unit HU having plural heads H arranged in a zigzag arrangement is also preferably used to cover the entire width of printing coated paper P.

The recording medium of the present invention is not specifically limited, which may be an ink absorbable recording medium or an ink non-absorptive recording medium. However, in the present invention, especially when the ink non-absorptive medium is used for high-speed printing, occurrence of bleed can adequately be prevented.

EXAMPLES

The present invention will now specifically be described with reference to examples that by no means limit the scope of the present invention. Incidentally, the designation of "parts" or "%" used in the examples represents "parts by mass" or "% by mass", unless otherwise specified.

<<Preparation of Pigment Dispersions>>
(Preparation of Magenta Pigment Dispersion)

As a pigment dispersant, 3 parts by mass of JONCRYL 690, 1.3 parts by mass of dimethylaminoethanol, and 80.7 parts by mass of ion exchange water were mixed while heating Then 15 parts by mass of C.I. Pigment Red 122 was added to this liquid mixture for premixing, followed by being dispersed using a sand grinder filled with 05 mm zirconia beads at a volume ratio of 50% to give a magenta pigment dispersion having a pigment solid of 15%.

JONCRYL 690 is a water-soluble acrylate resin neutralized with amine having an acid value of 240 mgKOH/g, an average molecular weight of 16,500, and pKa of 6.7. pKa was determined via titration of 100 ml aqueous solution with 0.5% solid content concentration by 0.02N hydrochloric acid aqueous solution at the velocity for one drop/3 minutes while agitating (Preparation of Cyan Pigment Dispersion)

As a pigment dispersant, 3 parts by mass of JONCRYL 690, 1.3 parts by mass of dimethylaminoethanol, and 80.7 parts by mass of ion exchange water were mixed while heating Then 15 parts by mass of C.I. Pigment Blue 15:3 was added to this liquid mixture for premixing followed by being dispersed using the sand grinder filled with 0.5 mm zirconia beads at a volume ratio of 50% to give a cyan pigment dispersion having a pigment solid of 15%.

<<Preparation of Inks>>
(Preparation of Ink 1-M)

The additives except the magenta pigment dispersion described below were mixed each at the following added amounts and sufficiently stirred and then 33 parts by mass of the magenta pigment dispersion was added while stirring. After sufficient stirring the resulting mixture was filtered with a metal filter of a mesh of #3500, followed by degassing using a hollow fiber membrane to prepare ink 1-M. Herein, JONCRYL70J is a water-soluble acrylic resin neutralized with an amine having pKa of 6.3. pKa was determined via titration of 100 ml aqueous solution with 0.5% solid content concentration by 0.02N hydrochloric acid aqueous solution at the velocity for one drop/3 minutes while agitating.

(Ink 1-M)

| | |
|---|---|
| Ammonium acetate (acetic acid: pKa = 4.76) | 2 parts by mass |
| CARBODILITE SV-02 (produced by Nisshinbo Chemical Inc.) (Solid content of 40%) | 13 parts by mass |
| JONCRYL 70J (produced by BASF) | 10 parts by mass |
| Magenta pigment dispersion | 33 parts by mass |
| Olfin E1010 (acetylene glycol-based surfactant, produced by Nissin Chemical Industry Co., Ltd.) | 0.5 parts by mass |
| KF351 (Silicone based surfactant, produced by Shin-Etsu Chemical Co., Ltd.) | 0.5 parts by mass |
| Diethylene glycol monoethyl ether | 7 parts by mass |
| Diethylene glycol monobutyl ether | 10 parts by mass |
| 2-Pyrrolidinone | 5 parts by mass |
| Water | 19 parts by mass |

Inks 2-M to 8-M and 10-M to 12-M were prepared in the same manner as Ink 1-M except for changing an acid, an amine and a cross-linking agent as listed in Table 1 and adding water so as to be 100 parts in whole ink.

Further, Ink 9-M was prepared in the same manner as Ink 1-M, except for changing an acid, an amine and a cross-linking agent as listed in Table 1, further changing magenta pigment dispersion which was prepared by using sodium hydroxide aqueous solution instead of dimethylamino ethanol and adding water so as to be 100 parts in whole ink.

TABLE 1

| Ink | Acid/Amine Species | Acid pKa | Content (parts) | Cross-linking agent species | Content (parts) | Water Content (parts) |
|---|---|---|---|---|---|---|
| 1-M | Ammonium acetate | 4.76 | 2 | CARBODILITE SV-02 | 13 | 19 |
| 2-M | Ammonium lactate | 3.66 | 2 | CARBODILITE SV-02 | 13 | 19 |
| 3-M | Ammonium salicylate | 2.96 | 2 | CARBODILITE SV-02 | 13 | 19 |
| 4-M | Ammonium tartrate | 3.04 | 2 | CARBODILITE SV-02 | 13 | 19 |
| 5-M | Acetic acid | 4.76 | 2 | CARBODILITE SV-02 | 13 | 16 |
|  | Dimethyl ethanol amine |  | 3 |  |  |  |
| 6-M | Ammonium acetate | 4.76 | 2 | EPOCROS WS-500 | 7.5 | 24.5 |
| 7-M | Ammonium acetate | 4.76 | 2 | CHEMITITE PZ-33 | 2 | 30 |
| 8-M | Ammonium carbonate | 10.33 | 2 | CARBODILITE SV-02 | 13 | 19 |
| 9-M | Sodium acetate | 4.76 | 2 | CARBODILITE SV-02 | 13 | 19 |
| 10-M | — | — | — | CARBODILITE SV-02 | 13 | 21 |
| 11-M | Ammonium acetate | 4.76 | 2 | — | — | 32 |
| 12-M | — | — | — | — | — | 34 |

Herein, the compounds used as the cross-linking agents in Table 1 are as follows:

CARBODILITE SV-02 (produced by Nisshinbo Chemical Inc.) (Solid content of 40%)

EPOCROS WS-500 (produced by Nippon Shokubai Co., Ltd.) (Solid content of 40%)

CHEMITHE PZ-33 (produced by Nippon Shokubai Co., Ltd.) (Solid content of 99% or more)

Further, Inks 1-C to 12-C were prepared in the same manner except for changing the magenta pigment dispersion to the cyan pigment dispersion. Herein, in the cyan pigment dispersion of Ink 9-C, cyan pigment dispersion was prepared by using sodium hydroxide aqueous solution instead of dimethylamino ethanol.

(Production of Ink Sets A-L)

Ink set A was produced by combining Ink 1-M with Ink 1-C, and in the same manner, Ink sets A-L via combinations of respective M and C were produced.

<<Formation of Print Images>>

[Formation of Image 1]

Using Ink set A, Image 1 was formed on printing coated paper and vinyl chloride by the following printing method.

As an inkjet recording apparatus, the inkjet recording apparatus of a single-pass system (a line-head system) described in FIG. 1 was used. As printing coated paper, SA KANEFUJI (art paper, Oji Paper Co., Ltd.) was used, while being conveyed at a conveyance rate of 280 mm/s, the image formed surface of recording medium P was heated to 40° C. using heating unit 13, and then Ink set A was ejected from head unit 11. Herein, the print surface temperature of the printing coated paper was determined using a non-contact type infrared thermometer.

Moreover, Ink set A was coated by using a wire bar (produced by YASUDA SEIKI SEISAKUSHO LTD.) to be 11 ml/m$^2$ on vinyl chloride (produced by METAMARK) of which image formation side was heated from the backside to be 50° C. and the dried predetermined time.

With regard to each of the heads (111-114), the nozzles of two heads each featuring 360 dpi arranged in a staggered arrangement as described in FIG. 2. As shown in FIG. 3, to cover the entire width of the printing coated paper, a plurally-arranged line-head system was constituted. Ink 1-M constituting Ink set A was ejected from head 112 and Ink 1-C constituting Ink set A was ejected from head 111 each at a print resolution of 720×720 dpi and an ink droplet amount of 16 pl. A solid cyan image of a printing rate of 100% was printed on a part of a solid magenta image of a printing rate of 100% to give Image 1.

[Formation of Images 2-7 and 9-13]

Using Ink sets B-L, images were formed in the same manner as in Formation of Image 1.

[Formation of Image 8]

Using Ink set A, Image was formed on vinyl chloride in the same manner as formation of Image 1, and also formed on a printing coated paper of which image formation side was heated to be 30° C.

<<Evaluation of Formed Images>>

[Evaluation of Abrasion Resistance]

The image formation side of the recording medium was left for drying for 5 minute and 10 minutes while keeping at the temperature listed in Table 2 by hot plate. Then, each of the resulting image surface was scrubbed 10 to 30 times by cotton (Kanakin No. 3) with load of 9N. Peeling off of ink and a transfer of ink to cotton were visually observed and abrasion resistance was evaluated based on the following criteria.

A: No peeling off of ink and a transfer of ink to cotton was observed after 30 times of reciprocating friction.

B: Slight peeling off of ink or a transfer of ink to cotton was observed after 30 times of reciprocating friction.

C: Peeling off of ink or a transfer of ink to cotton was observed after 30 times of reciprocating friction.

D: Peeling off of ink or a transfer of ink to cotton was observed before 30 times of reciprocating friction.

[Evaluation of Bleeding Resistance]

A solid image was printed in which a cyan image of a printing rate of 100% was printed on a part of a magenta image of a printing rate of 100%. The presence or absence of occurrence of bleeding (image bleeding) was visually observed. Bleeding resistance was evaluated based on the following criteria.

A: No bleeding occurrence is noted.

B: Almost no bleeding occurrence is noted.

C: Bleeding of a cyan image of 0.5 mm-less than 1.0 mm was noted.

D: Bleeding of a cyan image of at least 1.0 mm was noted.

TABLE 2

| Image No. | Ink set symbol | Ink Magenta | Ink Cyan | pKa Amine salt | pKa Pigment dispersant | pKa Fix resin | Heating temperature (°C.) | Abrasion resistance 5 minutes after drying | Abrasion resistance 10 minutes after drying | Bleeding resistance | Remarks |
|---|---|---|---|---|---|---|---|---|---|---|---|
| 1 | A | 1-M | 1-C | 4.76 | 6.7 | 6.3 | 40 | A | A | A | Inv. |
| 2 | B | 2-M | 2-C | 3.66 | 6.7 | 6.3 | 40 | A | A | A | Inv. |
| 3 | C | 3-M | 3-C | 2.96 | 6.7 | 6.3 | 40 | A | A | A | Inv. |
| 4 | D | 4-M | 4-C | 3.04 | 6.7 | 6.3 | 40 | A | A | A | Inv. |
| 5 | E | 5-M | 5-C | 4.76 | 6.7 | 6.3 | 40 | B | A | B | Inv. |
| 6 | F | 6-M | 6-C | 4.76 | 6.7 | 6.3 | 40 | A | A | A | Inv. |
| 7 | G | 7-M | 7-C | 4.76 | 6.7 | 6.3 | 40 | A | A | A | Inv. |
| 8 | A | 1-M | 1-C | 4.76 | 6.7 | 6.3 | 30 | B | A | B | Inv. |
| 9 | H | 8-M | 8-C | 10.33 | 6.7 | 6.3 | 40 | C | B | C | Comp. |
| 10 | I | 9-M | 9-C | 4.76 | 6.7 | 6.3 | 40 | C | B | C | Comp. |
| 11 | J | 10-M | 10-C | — | 6.7 | 6.3 | 40 | D | C | D | Comp. |
| 12 | K | 11-M | 11-C | 4.76 | 6.7 | 6.3 | 40 | D | D | B | Comp. |
| 13 | L | 12-M | 12-C | — | 6.7 | 6.3 | 40 | D | D | D | Comp. |

Inv.: Inventive example,
Comp.: Comparative example

The results described in Table 2 clearly show that the images formed based on the image forming method of the present invention exhibit excellent abrasion resistance even in cases where the drying time is short and further high bleeding resistance and storage stability compared to the comparative examples.

DESCRIPTION OF THE SYMBOLS

11: head units
12: conveyance mechanism
13: heating section
14: temperature control plate
111, 112, 113, and 114: heads
N: nozzle
P: printing coated paper
H: head
HU: head unit

What is claimed is:

1. An aqueous inkjet ink comprising water, a pigment, an organic or an inorganic acid, an amine, a resin which has a higher pKa than the organic or the inorganic acid, and a cross-linking agent, wherein the content of the organic acid or the inorganic acid is from not less than 1.55% by mass to not more than 10% by mass based on the ink.

2. The aqueous inkjet ink of claim 1, wherein the organic or the inorganic acid and the amine are formed via a disassociation of an amine salt.

3. The aqueous inkjet ink of claim 1, wherein the organic or the inorganic acid and the amine are formed via a disassociation of an ammonium salt.

4. The aqueous inkjet ink of claim 1, wherein the cross-linking agent has at least one selected from oxazoline group and carbodiimide group.

5. The aqueous inkjet ink of claim 1, wherein a concentration of the amine in the aqueous inkjet ink is in the range from 0.01 mol/L to 3.00 mol/L.

6. The aqueous inkjet ink of claim 1, wherein a pKa of the organic or the inorganic acid is not more than 5.

7. The aqueous inkjet ink of claim 1, wherein a content of the water is in the range from 20% by mass to 90% by mass based on the aqueous inkjet ink.

8. The aqueous inkjet ink of claim 1, wherein the pigment is dispersed by a resin which has a higher pKa than the organic or the inorganic acid.

9. An inkjet image forming method using the aqueous inkjet ink of claim 1, wherein an image forming surface of a recording medium on which the aqueous inkjet ink is ejected is heated in the range from 30° C. to 90° C.

* * * * *